(12) United States Patent
Kierstead

(10) Patent No.: US 9,840,357 B2
(45) Date of Patent: Dec. 12, 2017

(54) IMPLEMENT FOR TYING UP AND SUSPENDING OBJECTS

(71) Applicant: Richard Martin Kierstead, Vancouver (CA)

(72) Inventor: Richard Martin Kierstead, Vancouver (CA)

(73) Assignee: Richard Kierstead, Vancouver, B.C. (CA)

( * ) Notice: Subject to any disclaimer, the term of this patent is extended or adjusted under 35 U.S.C. 154(b) by 0 days.

(21) Appl. No.: 14/999,983

(22) PCT Filed: Jan. 26, 2015

(86) PCT No.: PCT/CA2015/000047
§ 371 (c)(1),
(2) Date: Jul. 21, 2016

(87) PCT Pub. No.: WO2015/109394
PCT Pub. Date: Jul. 30, 2015

(65) Prior Publication Data
US 2017/0066578 A1    Mar. 9, 2017

(30) Foreign Application Priority Data

Jan. 27, 2014   (CA) ...................................... 2840792

(51) Int. Cl.
| | |
|---|---|
| *B65D 63/16* | (2006.01) |
| *F16B 2/08* | (2006.01) |
| *B65H 75/36* | (2006.01) |
| *A44B 11/10* | (2006.01) |

(Continued)

(52) U.S. Cl.
CPC .............. *B65D 63/16* (2013.01); *A44B 11/10* (2013.01); *B65D 63/18* (2013.01); *B65H 75/366* (2013.01); *F16B 2/08* (2013.01); *B65D 2563/103* (2013.01); *H02G 3/32* (2013.01)

(58) Field of Classification Search
CPC .. A44B 11/10; B65D 2563/103; B65D 63/16; B65D 63/18; B65H 75/366; F16B 2/08; H02G 3/32
See application file for complete search history.

(56) References Cited

U.S. PATENT DOCUMENTS 515,747 A  *  3/1894  Carr ....................... G09F 3/0358
                                                          24/16 PB
2,551,384 A  *  5/1951  Middleton ............. A47H 19/00
                                                          16/87.2

(Continued)

*Primary Examiner* — David Upchurch

(57) ABSTRACT

The implement includes an elongated strap and a buckle intended to interlock with the elongated strap that includes a) first end and a second end which incorporates a suspending fixture, and b) an inner and outer sides. The elongated strap incorporates in inner side a plurality of teeth alternating with a plurality of grooves. The plurality of teeth extends from the first end up to a first no teeth zone located in proximity of the second end. A group of several teeth follows after the first no teeth zone. When wrapping the elongated strap, the buckle is kept in an indented retaining portion of the elongated strap with its several teeth projecting upwardly. After an adjustment of the elongated strap is completed, the buckle is so displaced that the several teeth penetrate corresponding grooves of the multiplicity of teeth.

2 Claims, 8 Drawing Sheets

(51) Int. Cl.
  *B65D 63/18* (2006.01)
  *H02G 3/32* (2006.01)

(56) References Cited

U.S. PATENT DOCUMENTS

| | | | | |
|---|---|---|---|---|
| 3,112,496 A * | 12/1963 | Dritz | ...................... | A41F 9/002 |
| | | | | 2/322 |
| 3,900,922 A * | 8/1975 | McCormick | ....... | B65D 63/1072 |
| | | | | 24/16 PB |
| 4,631,782 A * | 12/1986 | Gecs | ........................ | F16B 2/08 |
| | | | | 24/16 PB |
| 5,210,910 A * | 5/1993 | Hellwig | ............. | B65D 63/1027 |
| | | | | 24/16 R |
| 5,548,878 A * | 8/1996 | Romagnoli | .......... | A44B 11/258 |
| | | | | 24/168 |
| 5,832,567 A * | 11/1998 | Edwards | ............ | B65D 63/1027 |
| | | | | 24/16 PB |
| 7,263,745 B2 * | 9/2007 | Mori | .................. | B29C 45/2628 |
| | | | | 24/16 PB |
| 9,365,336 B2 * | 6/2016 | Moore | ............... | B65D 63/1018 |
| 2002/0152588 A1 * | 10/2002 | Robley | ............. | B65D 63/1018 |
| | | | | 24/16 PB |
| 2010/0061794 A1 * | 3/2010 | Sam | ........................ | B42F 13/10 |
| | | | | 402/8 |
| 2011/0162171 A1 * | 7/2011 | Gmeilbauer | .............. | F16B 2/08 |
| | | | | 24/16 R |
| 2013/0291343 A1 * | 11/2013 | Arjomand | ............ | B65D 63/1027 |
| | | | | 24/16 R |
| 2016/0244228 A1 * | 8/2016 | Montejo | ............ | B65D 63/1063 |

* cited by examiner

IMPLEMENT FOR TYING UP AND SUSPENDING OBJECTS

I. BACKGROUND OF THE INVENTION

1. Field of the Invention

The present invention relates, in general, to ways to handle objects, and, more particularly, to tying up and suspending objects.

2. Description of the State of the Art

Many people have a need for a simple and inexpensive way to handle objects. Thus, an implement to facilitate circumscribing, suspending and sometimes carrying rolls of material or different objects, which implement is not complicated and dependable, is needed Among the attempts which have being made are the following:

A first example is U.S. Pat. No. 7,849,568, granted Dec. 14, 2010 to Wilkinson for a "Cord Organizer". The organizer device comprises: a primary back strap, the primary back strap having a first end, a second end and a middle portion. The first end has a first buckle portion and a means for suspending the back strap. The second end has a second buckle portion, the middle portion having at least one attachment location with an appended buckle interposed between the first and second ends. The second end is provided to receive the first end of a second primary back strap and at least one removable cinch strap device having a first end and a second end. The first end has two buckle portions. A first buckle portion is for removable attachment to the attachment location with the appended buckle on the primary back strap and a second buckle portion to attach to a buckle portion at the second end of the cinch strap. Thus, it is possible to form a loop for holding a coil of cable, a power tool box or other material. As can be inferred from the above description, the organizer is complicated both structurally and functionally. A second example is U.S. Pat. No. 6,976,719, granted Dec. 20, 2005 to Agayof et al. for an "Adjustable plastic carry strap having laterally projecting handles" The adjustable carry strap with foldable handles, comprises an elongated and substantially planar, plastic strap portion having a first end, a second end, and a per-selected width. The second end has one or more longitudinally spaced male coupling portions, each male coupling portion extending from opposed lateral sides of the second end of the strap portion, adapted to matingly engage a female coupling portion, the first end terminating in the female coupling portion having a width larger than the pre-selected width of the strap portion, the female coupling portion having an aperture adapted to serially receive each male coupling portion of the second end of the strap portion, each of said male coupling portions, when inserted into the aperture of the female coupling portion, being capable of detachable engaging a part of the female coupling portion; a pair of handle half portions, each handle half extending from opposed lateral sides of the strap portion, and being aligned substantially symmetrically to one another about a longitudinal axis of the strap, each handle half portion having a U-shape with two or more connecting portions substantially perpendicular to the longitudinal axis of the strap portion and one grip portion arranged between the two connecting portions, laterally spaced from the lateral edge of the strap portion, and substantially parallel to the longitudinal axis of the strap portion, the handle half portions initially being coplanar with the strap and the two laterally opposed and symmetrically aligned handle half portions being adapted to fold together in-situ to an upright position to form a handle for the strap portion. A major disadvantage of the foregoing carry strap resides in its lack of simplicity.

II. SUMMARY OF THE INVENTION

To overcome the drawbacks of the prior art, one can conclude that there is a need for an improved implement for tying-up and suspending objects.

Thus, a first objective of the present invention is to develop a simple and durable implement.

A second objective of the present invention is the production soundness, i.e. the shape and material of the two components should be selected such that their production requires the minimum expenditures of tools, labor and time.

Broadly stating, the implement for tying up and suspending objects comprises an elongate strap and a buckle that interlocks with the elongated strap. The elongated strap includes a first end and a second end that incorporates a suspending fixture, and an inner side and an outer side. The elongated strap further includes in the inner side a plurality of teeth, equally spaced and transversely disposed with respect to a longitudinal direction of the elongated strap, a plurality of grooves alternating with the plurality of teeth. Each tooth of the plurality of teeth has a triangular cross section and each groove of the plurality of grooves has such a shape and size as to correspond to each tooth of the plurality of teeth. The elongated strap, laterally, at each side of the plurality of teeth and the plurality of grooves, starting from bottoms of the plurality of teeth and the plurality of grooves, is provided with an ascending slanted zone, followed by a flat zone, parallel to the elongated strap, then by an externally directed, descending slanted zone and, finally, terminates into a straight zone perpendicular to the elongated strap. The plurality of teeth extending from the first end up to a first recessed zone located in proximity of the second end, a group of several teeth alternating with a group of several grooves following after the first recessed zone. The inner side further incorporating a second recessed zone, located after the group of several teeth and after the group of several grooves. The outer side incorporates an internal stop projecting outwardly beyond an overall thickness of the elongated strap and ending into a first contact surface perpendicular to the elongated strap. The first contact surface is so positioned on the outer side as to correspond to the beginning of the group of teeth situated on the inner side. The outer side incorporating as well an external stop disposed close to an extremity of the second end and projecting outwardly, beyond the overall thickness of the elongated strap and ending into a second contact surface perpendicular to the elongated strap, first and second contact surfaces being parallel. A first indented retaining zone starting from the first contact surface of the internal stop and, lengthwise, having such a dimension that enables the buckle to be lodged there, the implement being in a final closed position. A second indented retaining zone starts from the second contact surface of the external stop and, lengthwise, has such a dimension that enables the buckle to be lodged there during a tying up of the implement. An indented transition-intermediary zone, slightly wider than the first and second indented retaining zones is interposed between the former and the latter, so that the buckle is kept in place. According to one aspect of this invention, the implement further comprises a a ridge engaging tooth, projecting out along the cavity, at midway of each of lateral sides, is provided with intersecting sides for contacting the descending slanted zones, so that the buckle allows an easy passage of the elongated strap. Each tooth of the plurality of teeth has in cross-section a triangular shape which is defined by an isosceles triangle. Each suspending fixture of the implement could easily be adapted to an intended use. To keep the buckle either in the first indented retaining portion or in the second indented retaining portion, no hand is necessary. To move the buckle from the first indented retaining portion to the second indented retaining portion or vice verso, a slight manual effort to move the buckle along the indented transition-intermediary is needed. The buckle has a shape of a rectangular parallelepiped that incorporates a cavity delimited by a top, a bottom, lateral sides, an entrance and an exit being used for a passage of the first end or the second end, or both.

III. BRIEF DESCRIPTION OF THE DRAWINGS

The subject matter of the invention is particularly pointed out and distinctively claimed in the concluding portion of the specification. The invention, however, both in structure and operation may be better understood by reference to the following description taken in conjunction with the subjoined claims and the accompanying drawings of which FIG. 1 illustrates a diagrammatic lateral view of the implement disclosed in the present invention, in a flat position;

IV. DESCRIPTION OF THE PREFERRED EMBODIMENT—VARIANTS

The accompanying drawings, as above described, illustrate preferred embodiments of an "Implement for tying up and suspending objects"

Figure 1:
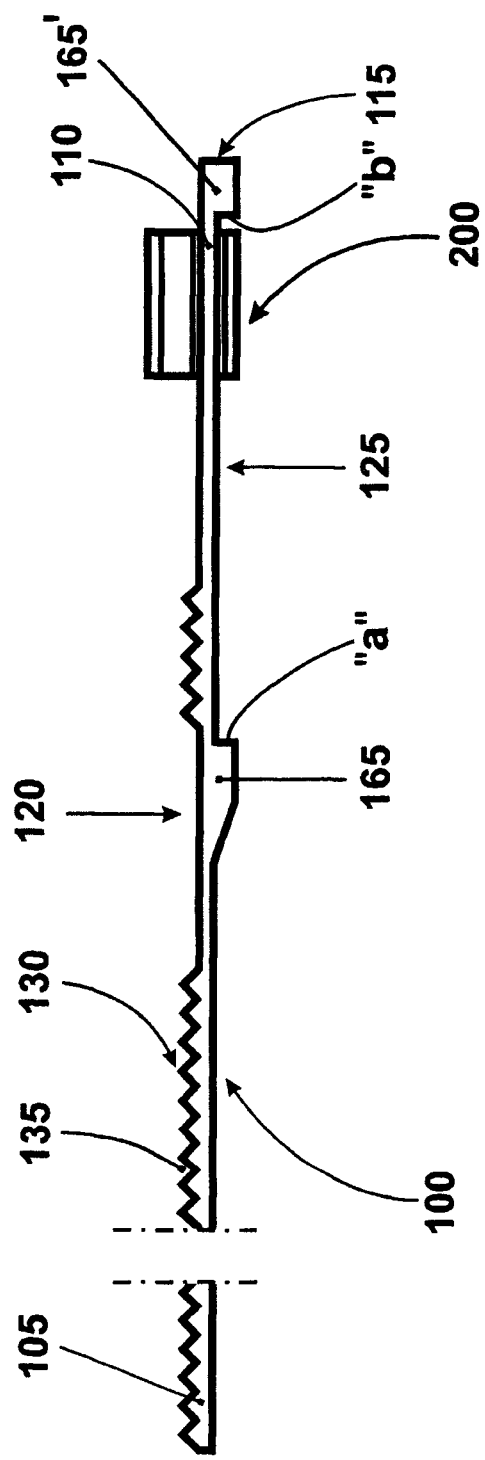
Figure 2:
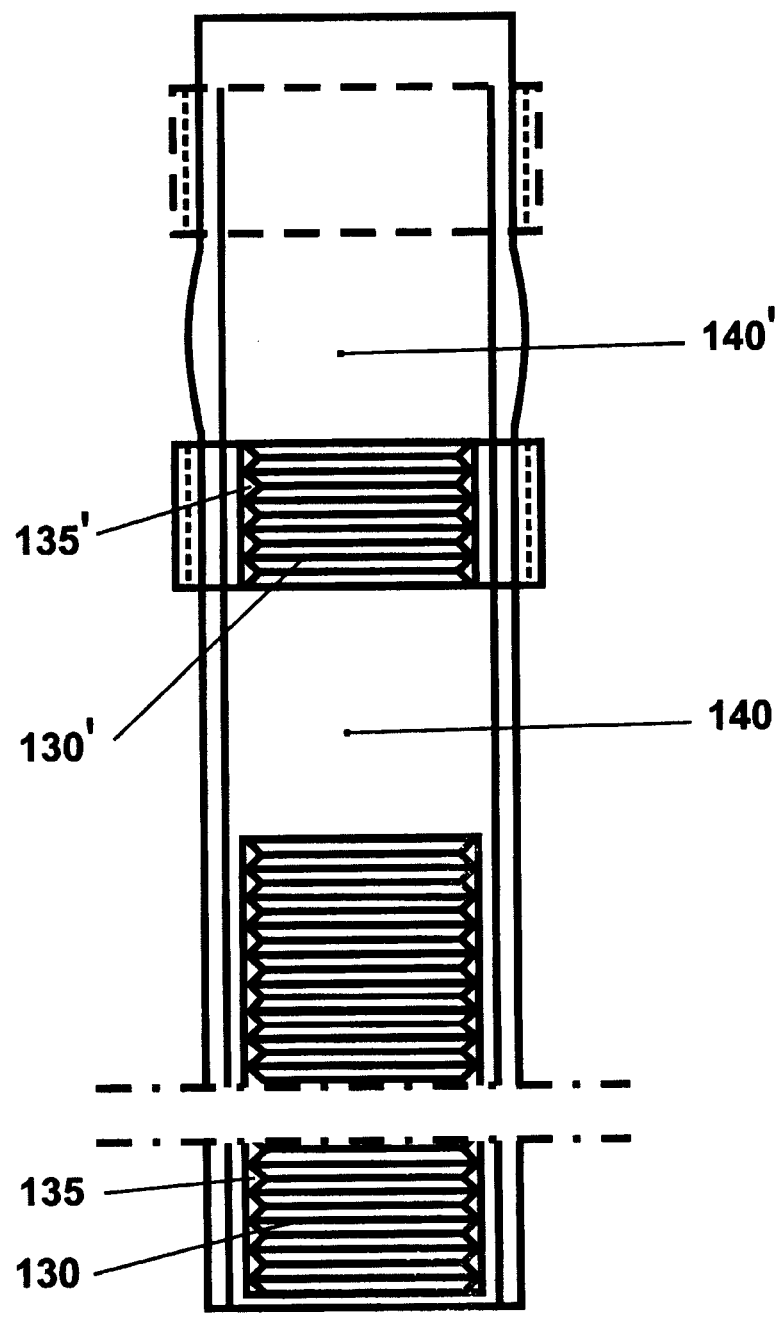
FIG. 2 illustrates a diagrammatic inner side view of the implement of FIG. 1, in a flat position.
Figure 3:
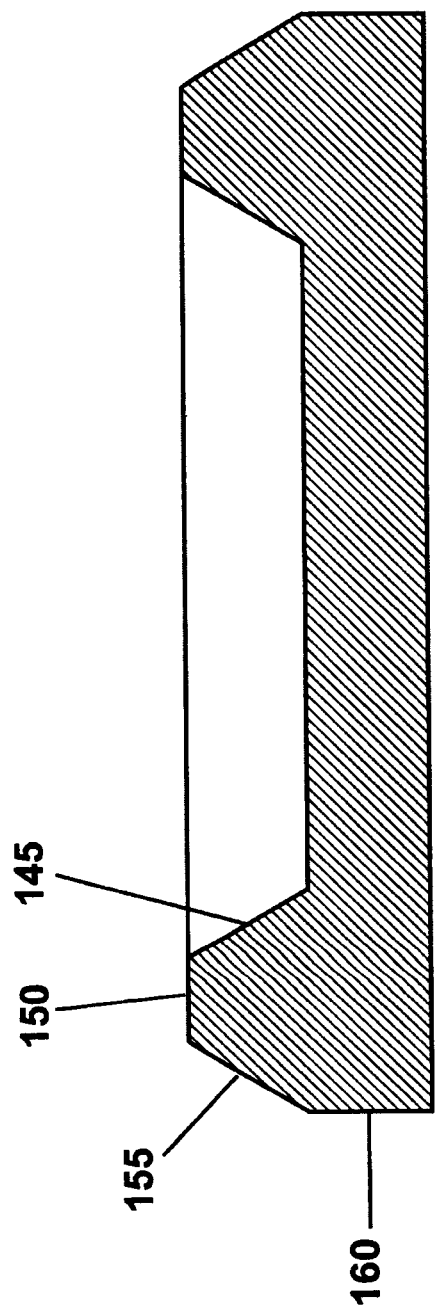
FIG. 3 illustrates a vertical cross-section throughout one tooth of the multiplicity of teeth of the elongate strap.
Figure 4:
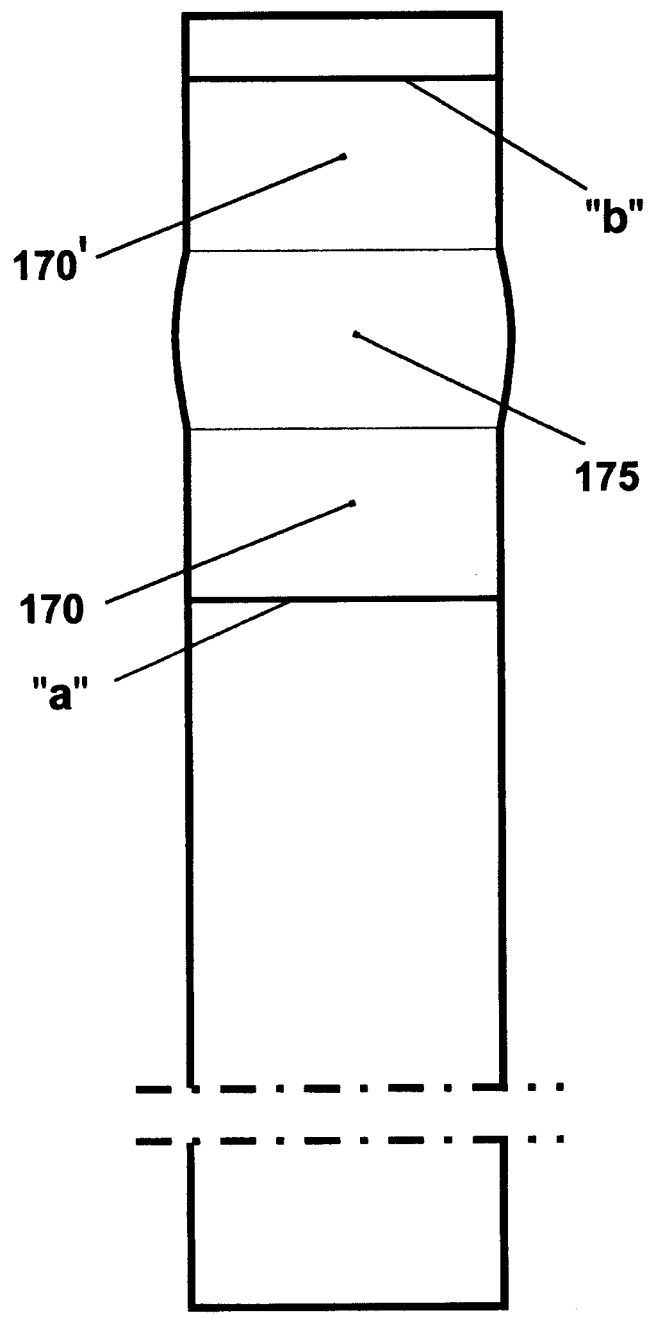
FIG. 4 illustrates a diagrammatic outer side view of the implement of FIG. 1, in a flat position.
Figure 5:
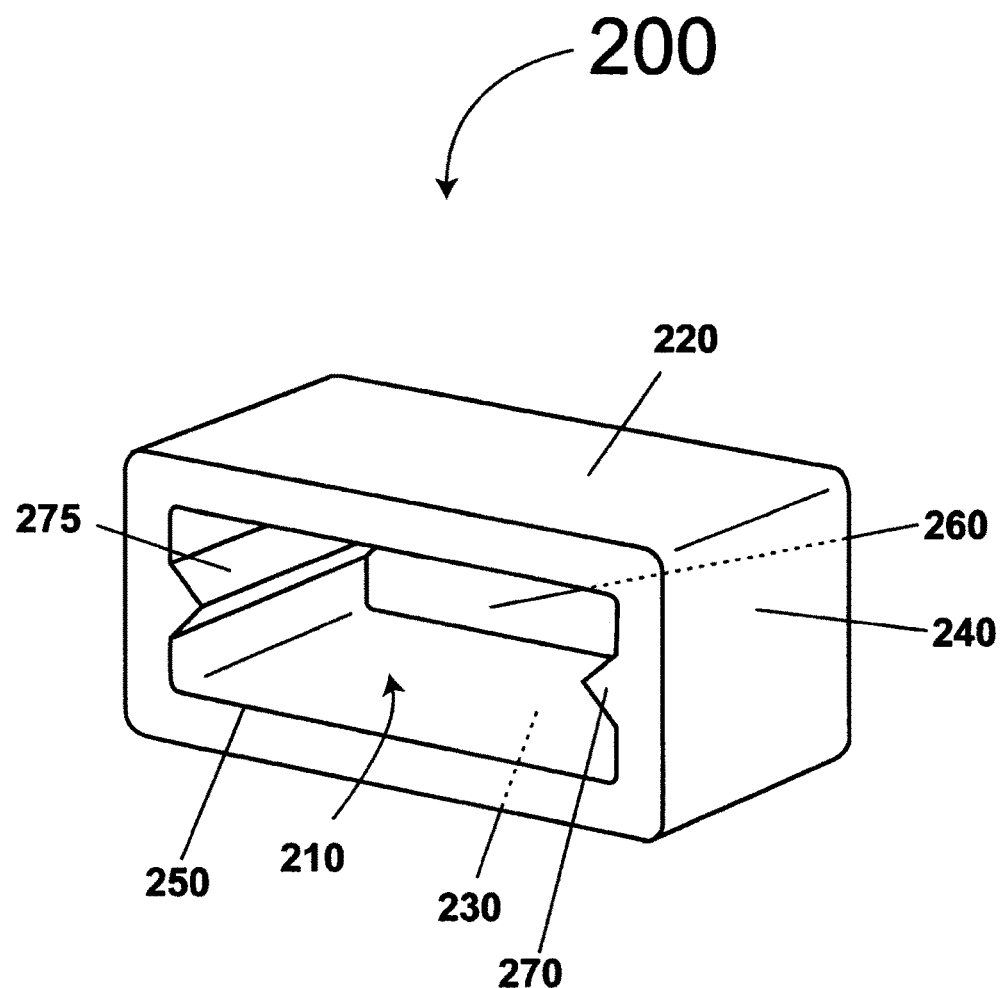
FIG. 5 illustrates an axonometric projection of the buckle of the implement.
Figure 6:
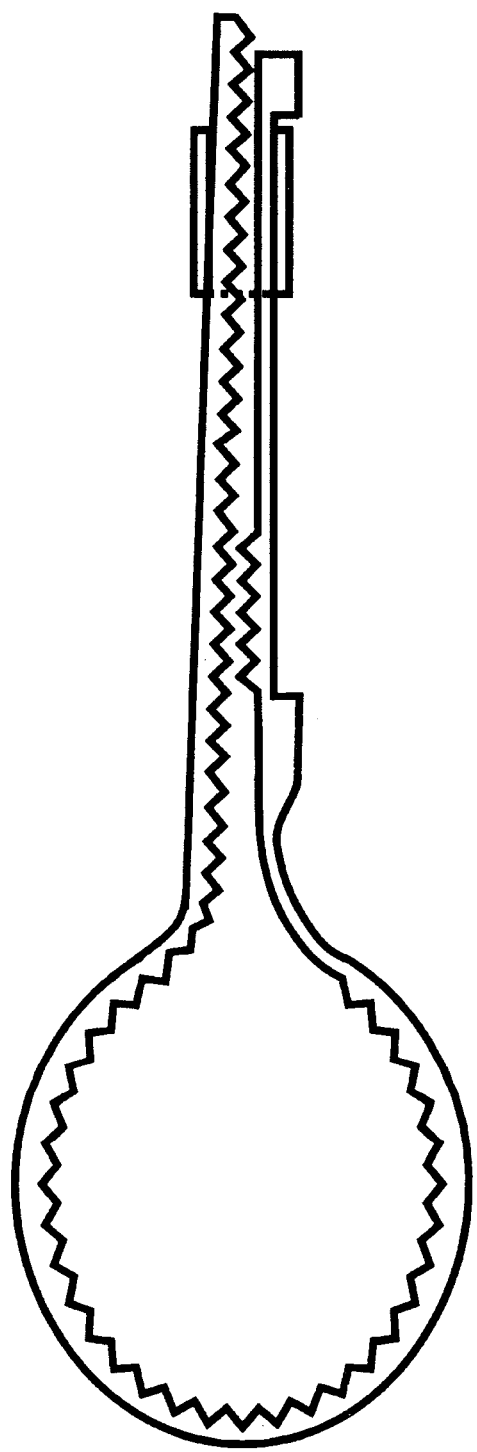
FIG. 6 illustrates a diagrammatic lateral view of the implement during a tying-up operation.
Figure 7:
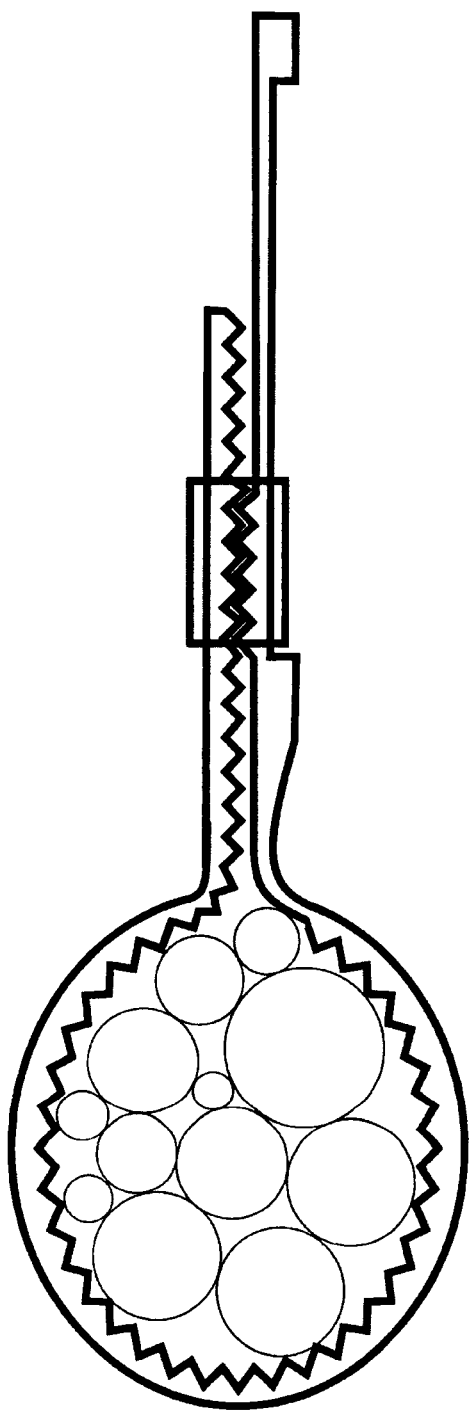
FIG. 7 illustrates a diagrammatic lateral view of the implement, in a final, closed position.
Figure 8:
FIG. 8 illustrates elevations views of different suspension fixtures.
Figure 8:
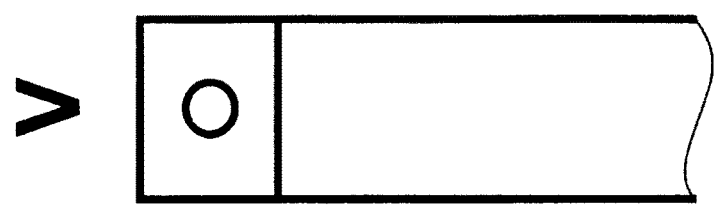
Figure 8:
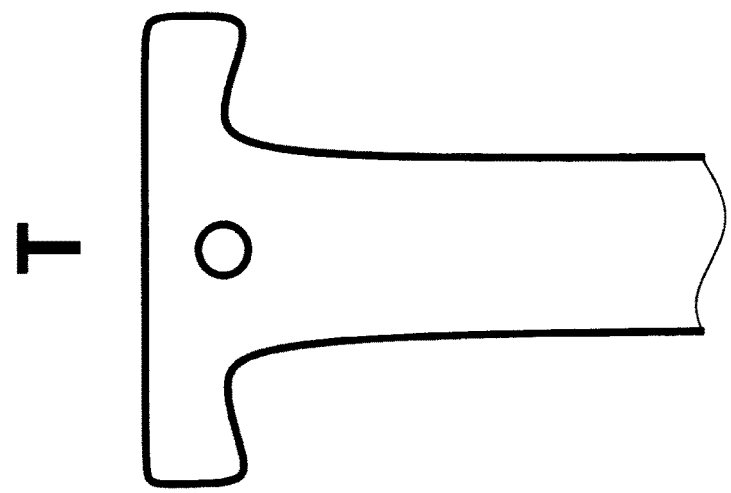
Figure 8:
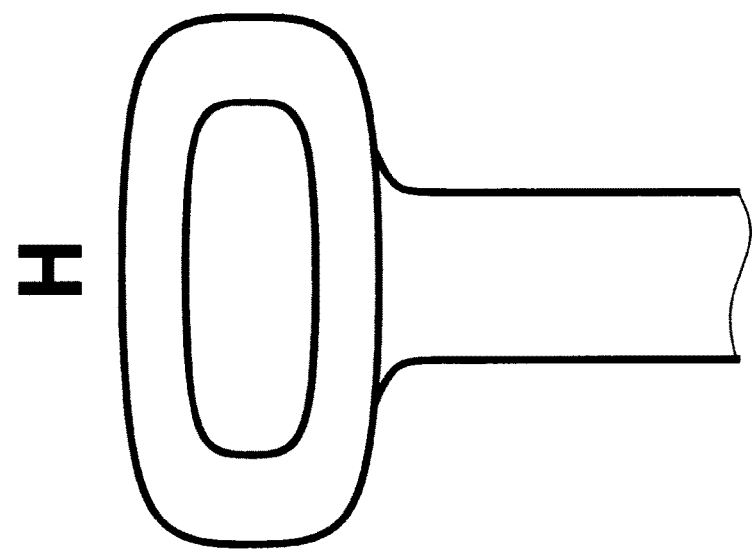

Referring now to FIGS. 1 to 8, in which like numerals indicate like components and features, the "Implement for tying up and suspending objects", further called "Implement", is generally designated with numeral 10. Implement 10 includes an elongated strap 100, made of semi-rigid plastic material, and a buckle 200, made of rigid plastic material and intended for interlocking with elongated strap 100.

Elongated strap 100 further includes a first end 105 and a second end 110 that incorporates a suspending fixture 115, and an inner side 120 and an outer side 125.

Elongated strap 100 incorporates in inner side 120 a plurality of teeth 130, equally spaced and transversely disposed with respect to the longitudinal direction of elongated strap 100. A plurality of grooves 135 alternates with plurality of teeth 130. Each tooth of plurality of teeth 130 has in cross-section a triangular shape and each groove of plurality of grooves 135 has a shape and a size corresponding to each tooth of plurality of teeth 130.

Plurality of teeth 130 extends from first end 105 up to a first no teeth zone 140 located in proximity of second end 110. A group of several teeth 130', alternating with a group of several grooves 135', follows after first no teeth zone 140. Inner side 120 further incorporates a second no teeth zone 140' located after the group of several teeth 130' and the group of several grooves 135'. First no teeth zone 140 and second no teeth zone 140' are at level corresponding to bottoms of the group of several teeth 130' and the group of several grooves 135'. Elongated strap 100, laterally, at each side of multiplicity of teeth 130 and multiplicity of grooves 135, starting from bottoms of multiplicity of teeth 130 and multiplicity of grooves 135, is provided with an ascending slanted zone 145, followed by a flat zone 150, parallel to elongated strap 100, then by an externally directed, descending slanted zone 155 and, finally, terminates into a straight zone 160 perpendicular to elongated strap 100.

Outer side 125 incorporates an internal stop 165 projecting outwardly beyond the overall thickness of elongated strap 100 and ending into a contact surface "a" perpendicular to elongated strap 100. Contact surface "a" is so positioned on outer side 125 as to correspond to the beginning of the group of teeth 130' situated on the inner side 120.

Outer side 125 incorporates as well an external stop 165', disposed close to an extremity of second end 110 and projecting outwardly, beyond the overall thickness of elongated strap 100 and ending into a contact surface "b" perpendicular to elongated strap 100. Contact surfaces "a" and "b" are parallel.

A first indented retaining zone 170 starts from contact surface "a" of internal stop 165 and, lengthwise, has such a dimension that enables buckle 200 to be lodged therein, when implement 10 is in a final closed position. A second indented retaining zone 170' starts from contact surface "b" of external stop 165' and, lengthwise, has such a dimension as to enable buckle 200 to be lodged therein during a tying up of implement 10. An indented transition-intermediary zone 175, slightly wider than first and second indented retaining zones 170 and 170' is interposed between the former and the latter, so that buckle 200 is kept in place either in first indented retaining portion 170 or in second indented retaining portion 170', no hand being necessary therefore. To move buckle 200 from first indented retaining portion 170 to second indented retaining portion 170' or vice verso, a slight manual effort to move buckle 200 along indented transition-intermediary zone 175 is needed.

Buckle 200 has a shape of a rectangular parallelepiped that incorporates a cavity 210 delimited by a top 220, a bottom 230, lateral sides 240, an entrance 250 and an exit 260, the former and the latter intended for a passage of first end 105 or second end 110, or both, when the former and the latter are superposed.

A ridge engaging tooth 270 projecting out along cavity 210, at midway of each lateral sides 240, is provided with intersecting sides 275 for contacting descending slanted zones 165, so that buckle 200 enables an easy passage of elongated strap 100.

In order to wrap elongated strap 100 around an object, buckle 200 is kept in second indented retaining portion 170' of elongated strap 100 at a lower part of cavity 210, with its several teeth 130' projecting upwardly. During an adjustment of elongated strap 100, the latter starting with first end 105 is firstly inserted through cavity 210, above second end 110, and, then, after the tightening is terminated, buckle 200 is so displaced that several teeth 130' penetrate corresponding grooves 135 of multiplicity of teeth 130, being firmly held together by buckle 200.

Describing elongated strap 100 in more detail, the following is added: a) each tooth of plurality of teeth 130 has in cross-section a triangular shape which is defined by an isosceles triangle; b) there are several variants of suspending fixture 115: in one variant, suspending fixture 115 is a handle H for inserting a hand for grabbing and carrying implement 10, when elongated strap 100 is wrapped around an object; in another variant, suspending fixture 115 is a T; in a last variant suspending fixture 115 incorporates an extended, thickened segment (V-front view and V'-lateral view). The last variant is provided with a central through hole adapted to be penetrated by a nail (not shown) for securing implements 10 to vertical bases (also not shown). For various specific necessities, other variants can be envisaged.

What I claim is:

1. An implement for tying up and suspending objects comprising an elongate strap, made of semi-rigid plastic material, and a buckle, made of rigid plastic material, and used to interlock with said elongated strap that includes a first end and a second end that incorporates a suspending fixture, and an inner side and an outer side, said elongated strap further including in said inner side a plurality of teeth, equally spaced and transversely disposed with respect to a longitudinal direction of said elongated strap, a plurality of grooves alternating with said plurality of teeth, each tooth of said plurality of teeth has in cross-section a triangular shape and each groove of said plurality of grooves has such a shape and size as to correspond with each tooth of said plurality of teeth; said elongated strap, laterally, at each side of said plurality of teeth and said plurality of grooves, starting from bottoms of said plurality of teeth and said plurality of grooves, being provided with an ascending slanted zone, followed by a flat zone, parallel to said elongated strap, then by an externally directed, descending slanted zone and, finally, terminates into a straight zone perpendicular to said elongated strap; said plurality of teeth extending from said first end up to a first recessed zone located in proximity of said second end, a group of several teeth alternating with a group of several grooves following after said first recessed zone, said inner side further incorporating a second recessed zone, located after said group of several teeth and after said group of several grooves; said outer side incorporating an internal stop projecting outwardly beyond an overall thickness of said elongated strap and ending into a first contact surface perpendicular to said elongated strap; said first contact surface being so positioned on said outer side as to correspond to the beginning of said group of teeth situated on said inner side;

said outer side incorporating as well an external stop disposed close to an extremity of said second end and projecting outwardly, beyond said overall thickness of said elongated strap and ending into a second contact surface perpendicular to said elongated strap, first and second contact surfaces being parallel; a first indented retaining zone starting from said first contact surface of said internal stop and, lengthwise, having such a dimension that enables said buckle to be lodged there, said implement being in a final closed position; a second indented retaining zone starting from said second contact surface of said external stop and, lengthwise, having such a dimension that enables said buckle to be lodged there during a tying up of said implement; an indented transition-intermediary zone, slightly wider than said first and second indented retaining zones being interposed between the former and the latter, so that said buckle is kept in place, either in said first indented retaining portion or in said second indented retaining portion, no hand being necessary therefor;

for moving said buckle from said first indented retaining portion to said second indented retaining portion or vice versa, a slight manual effort to move said buckle along said indented transition-intermediary is needed; and said buckle having a shape of a rectangular parallelepiped that incorporates a cavity delimited by a top, a bottom, lateral sides, an entrance and an exit for a passage of said first end or said second end, or both.

2. The implement as defined in claim 1, further comprising a ridge engaging tooth, projecting out along said cavity, at midway of each of said lateral sides, is provided with intersecting sides for contacting said descending slanted zones, so that said buckle allows an easy passage of said elongated strap; each tooth of said plurality of teeth has in cross-section a triangular shape which is defined by an isosceles triangle; and each said suspending fixture for said implement is directly adaptable to an intended use.

\* \* \* \* \*